No. 773,849. PATENTED NOV. 1, 1904.
A. J. COLLAR.
MEANS FOR OPENING OR CLOSING WATER GATES.
APPLICATION FILED NOV. 24, 1903.
NO MODEL.
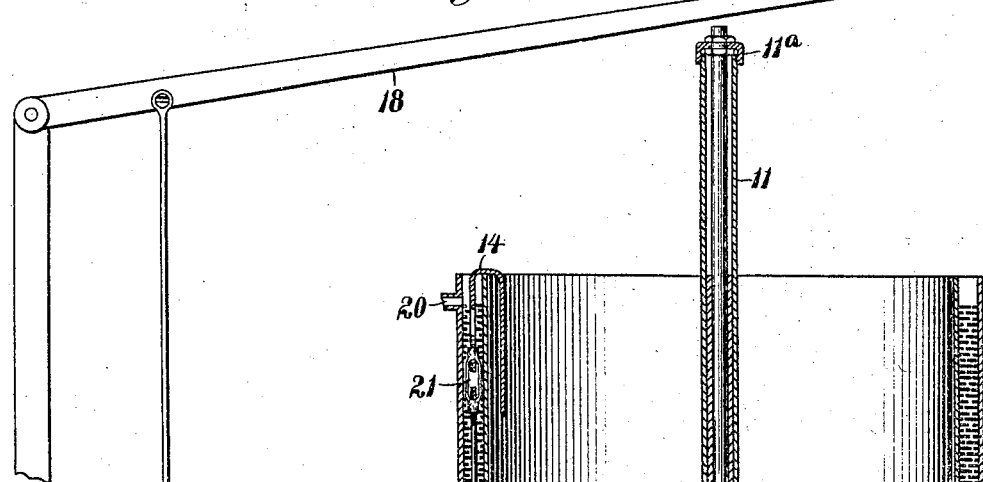
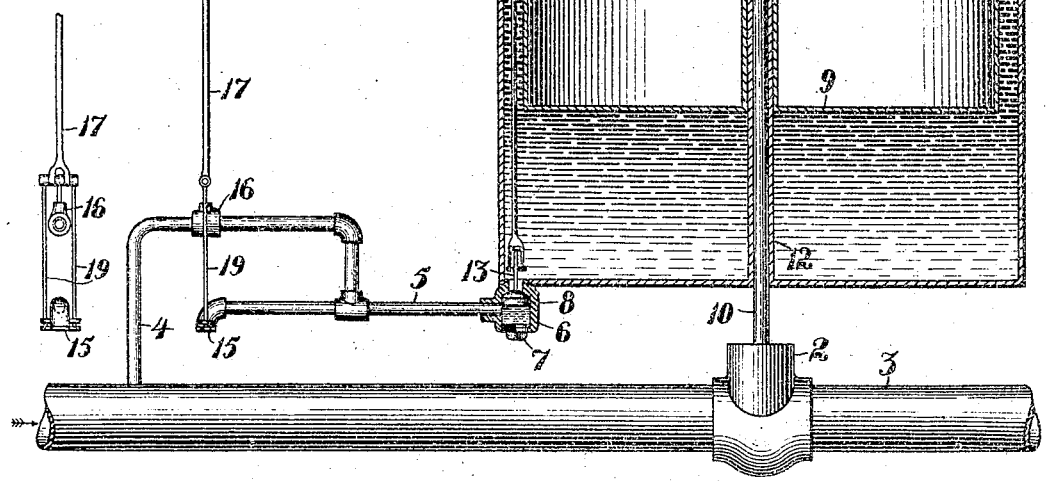
Witnesses:—
Inventor,
Adoniram J. Collar
By Geo. H. Strong.
Atty No. 773,849. Patented November 1, 1904.

UNITED STATES PATENT OFFICE.

ADONIRAM J. COLLAR, OF YREKA, CALIFORNIA.

MEANS FOR OPENING OR CLOSING WATER-GATES.

SPECIFICATION forming part of Letters Patent No. 773,849, dated November 1, 1904.

Application filed November 24, 1903. Serial No. 182,462. (No model.)

*To all whom it may concern:*

Be it known that I, ADONIRAM J. COLLAR, a citizen of the United States, residing at Yreka, in the county of Siskiyou and State of California, have invented new and useful Improvements in Means for Opening or Closing Water-Gates, of which the following is a specification.

My invention relates to an improved apparatus for opening and closing water-gates in mains, reservoirs, and the like. Its object is to provide a simple means for easily and quickly opening and closing gates either to be operated locally or automatically from a remote point. This means contemplates the use of the water under control to effect the desired end.

The invention consists in the parts and the construction and combination of parts, as hereinafter more fully described, having reference to the accompanying drawings, in which—

Figure 1 is a view of my apparatus shown partly in section. Fig. 2 is an end view of the inlet and outlet valves.

A represents a tank, of suitable size and material, disposed above the control-gate 2 in main 3 and adapted to be filled with water on occasion through the medium of a feed-pipe 4 and its continuation 5, connecting the main above gate 2 and the bottom of the tank. Pipe-section 5 has one end screwed into a T 6, the latter being connected to the tank and having its opposite end closed by a screw-plug 7, the T forming a suitable chamber for the operation of the float-valve 8, by which the admission of water to the tank is checked.

A suitable weighted annular float 9 is movable in tank A and when the latter is empty is normally supported on the valve-stem 10 to hold gate 2 closed by means of the tubular extension of the inner wall 11 of the float and the cap 11$^a$. Stem 10 extends centrally up through the tank and the float, being slidable in a tubular guide 12, rigid with the tank. By this arrangement of telescoping parts 11 and 12 the water is impounded in the tank without need of stuffing-boxes or like friction-causing devices, as would be necessary if the stem passed directly through the bottom of the tank.

The stem 13 of float-valve 8 extends up into the tank and is adapted to slide on or telescope with a supplemental stem 14, the upper end of which is bent over the rim of the float and adapted when the float rises to its highest point to be lifted, allowing valve 8 to rise and close the entrance to the tank. Normally the stem portion 14 holds the valve open by gravity.

Pipe 4 enters pipe 5 intermediate of the ends of the latter. Discharge from one end of pipe 5, as we have seen, is controlled by the float-valve 8. Discharge from the opposite end is controlled by an externally-operated valve 15, actuated in unison with the feed-water inlet-valve 16 in pipe 4.

The operation of valve 16 is effected by means of a stem 17, connected to lever 18, fulcrumed to a fixed support. Valve 15 is connected with stem 17 by means of the external links 19.

In operation to open gate 2 lever 18 is lifted, causing valve 16 to open and valve 15 to close, thus admitting water to tank A, valve 8 being held open by the weight of stem-section 14. As the tank fills the float is gradually lifted, opening gate 2, and finally by raising stem 14 allowing float-valve 8 to rise in its chamber and prevent further ingress of water to the tank. Overflow from the latter is provided for at 20. So long as the float remains buoyed up gate 2 is held open. The size of the gate-opening may be varied by changing the length of stem 14, as by the turnbuckle 21, causing the valve 8 to close sooner or later in the upward movement of the float. To close gate 2 and shut off the head, lever 18 is thrown down, closing feed-valve 16 and opening the drain-valve 15. Thereupon the water in tank A is quickly discharged and the float falls and finally rests with all its weight on stem 10 to hold gate 2 closed.

Having thus described my invention, what I claim, and desire to secure by Letters Patent, is—

1. The combination with a water-gate, of a receptacle adapted to contain water, fluid connections between said receptacle and a source of fluid-supply, a valve controlling flow from said source of supply into said fluid connections, a valve controlling the inlet to said receptacle from said connections, and a discharge-valve intermediate of said control-valves, and means for operating the gate through the medium of the fluid in the receptacle.

2. The combination with a water-gate, of a receptacle adapted to contain water, fluid connections between said receptacle and a source of fluid-supply, a valve controlling flow from said source of supply into said fluid connections, a valve controlling the inlet to said receptacle from said connections, and a discharge-valve intermediate of said control-valves, means for giving the first control-valve and said discharge-valve a synchronous movement, and means for operating the gate through the medium of the fluid in the receptacle.

3. The combination with a water-gate, of a receptacle adapted to contain water, fluid connections between said receptacle and a source of fluid-supply, a valve controlling flow from said source of supply into said fluid connections, a valve controlling the inlet to said receptacle from said connections, and a discharge-valve intermediate of said control-valves, said inlet-control valve governable by the rise and fall of liquid in said receptacle, and means for operating the gate through the medium of the fluid in the receptacle.

4. The combination with a water-gate, of a receptacle adapted to contain water, a float therein, connections between the gate and float to operate the former by the movement of the latter, connections between the float and a source of water-supply, a valve controlling flow from said source of supply to said connections, an inlet-control valve for the receptacle, means operatable by the movements of the float governing said inlet-valve, and a discharge-valve intermediate of said named valves.

5. The combination with a water-gate, of a receptacle adapted to contain water, a float therein, connections between the gate and float to operate the former by the movement of the latter, connections between the float and a source of water-supply, a valve controlling flow from said source of supply to said connections, an inlet-control valve for the receptacle, means operatable by the movements of the float governing said inlet-valve, and a discharge-valve intermediate of said named valves, and means for giving the first-named control-valve and said discharge-valve a synchronous movement whereby one is opened when the other is closed.

6. The combination with the stem of a water-gate, of a reciprocating buoyant part connected therewith, a tank in which said part is movable, and means for charging and discharging said tank to reciprocate said part and open and close said gate, said means including fluid connections between said tank and a source of liquid-supply, a control-valve in said connections, a discharge-valve, and means for operating the valve synchronously.

7. The combination with the valve of a water-gate said valve normally closed by gravity, of a receptacle to contain water, a float in said receptacle, operating connections between the float and valve, and fluid connections between the receptacle and the controlled fluid-supply and including a control-valve in the connections, a discharge-valve, and means for operating the valves synchronously.

8. The combination with a water-gate, of a valved receptacle adapted to contain water, a float in said receptacle, and operating connections between said float and gate, fluid connections between said receptacle and the controlled fluid-supply above said gate, and means including a control-valve in the connections, a discharge-valve, and means for operating the valve synchronously, said means controlling flow through said fluid connections.

9. The combination with a water-gate, of a receptacle adapted to contain water, fluid connections between said receptacle and a source of liquid-supply, said connections including a pipe-section having a discharge-outlet, a valve in said outlet, a feed-pipe entering said section between said outlet-valve and the receptacle, a control-valve in said feed-pipe, means for operating said valves simultaneously, and means for operating the gate through the medium of the water in the receptacle.

10. The combination with the stem of a water-gate, of a receptacle adapted to contain water, a float normally resting by gravity on said stem, said float and stem operatable in unison, fluid connections with a source of supply and said receptacle, and means operatable by the movements of said float to control the admission of water to said receptacle, and means for discharging said receptacle.

11. In means for controlling water-gates, the combination with a receptacle adapted to contain water, of a float, an inlet-pipe, a valve in said inlet operatable by the movements of the float, a discharge-valve in said inlet-pipe, a feed-pipe entering said inlet-pipe intermediate of said valves, a control-valve in said feed-pipe, and means for closing said discharge-valve simultaneously with the opening of said control-valve and conversely opening said discharge-valve and closing said control-valve.

12. In means for controlling water-gates, the combination with a receptacle adapted to contain water, of an inlet-pipe having a valved discharge-outlet, a feed-water pipe entering said inlet-pipe, a control-valve in said feed-pipe and means by which said discharge-valve may be closed simultaneously with the opening of the said control-valve, and conversely the discharge-valve opened on the closing of the control-valve.

In testimony whereof I have hereunto set my hand in presence of two subscribing witnesses.

ADONIRAM J. COLLAR.

Witnesses:
L. F. COBURN,
E. F. CONNOR.